(12) United States Patent
Sasaki

(10) Patent No.: US 9,413,925 B2
(45) Date of Patent: Aug. 9, 2016

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takashi Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/520,755

(22) Filed: Oct. 22, 2014

(65) Prior Publication Data

US 2015/0117771 A1    Apr. 30, 2015

(30) Foreign Application Priority Data

Oct. 30, 2013    (JP) .................................. 2013-225816

(51) Int. Cl.
| | | |
|---|---|---|
| G06K 9/00 | (2006.01) | |
| H04N 1/60 | (2006.01) | |
| G06T 5/00 | (2006.01) | |
| H04N 1/407 | (2006.01) | |
| H04N 1/62 | (2006.01) | |
| G06K 9/46 | (2006.01) | |

(52) U.S. Cl.
CPC .......... *H04N 1/6027* (2013.01); *G06K 9/00234* (2013.01); *G06T 5/007* (2013.01); *H04N 1/4072* (2013.01); *H04N 1/628* (2013.01); *G06K 9/4642* (2013.01); *G06T 2207/10024* (2013.01); *G06T 2207/20081* (2013.01); *G06T 2207/30196* (2013.01); *G06T 2207/30201* (2013.01)

(58) Field of Classification Search
CPC ................ G06T 7/0081; G06T 9/4652; G06T 2207/10024; G06T 7/0087; G06T 7/0093; G06T 2207/10028; G06T 2207/20144; G06K 9/4652; G06K 9/342
See application file for complete search history.

(56) References Cited

FOREIGN PATENT DOCUMENTS

| | | |
|---|---|---|
| JP | 2004-200808 A | 7/2004 |
| JP | 2005-266981 A | 9/2005 |
| JP | 2010-244360 A | 10/2010 |
| JP | 2011-100204 A | 5/2011 |
| JP | 2011-141622 A | 7/2011 |
| JP | 2011-210238 A | 10/2011 |

*Primary Examiner* — Duy M Dang
(74) *Attorney, Agent, or Firm* — Cowan, Liebowitz & Latman, P.C.

(57) ABSTRACT

An image processing apparatus comprises a detection unit configured to detect a person region included in an image, a first calculation unit configured to calculate first tone characteristics based on information concerning the person region detected by the detection unit, a second calculation unit configured to calculate second tone characteristics based on predetermined tone characteristics and the first tone characteristics calculated by the first calculation unit, and an image processing unit configured to perform tone correction processing by using the second tone characteristics calculated by the second calculation unit.

14 Claims, 13 Drawing Sheets

F I G. 13

| FACE SKIN REGION BRIGHTNESS DETERMINATION | HAIR REGION BRIGHTNESS DETERMINATION | PROCESSING CONTENTS |
|---|---|---|
| FACE SKIN REGION LUMINANCE ≥ THRESHOLD T0 | HAIR REGION LUMINANCE ≥ THRESHOLD T1 | FIXED GAIN AMOUNT IS CALCULATED FROM HIGHER ONE OF REPRESENTATIVE LUMINANCE VALUES OF FACE SKIN REGION AND HAIR REGION |
| FACE SKIN REGION LUMINANCE ≥ THRESHOLD T0 | HAIR REGION LUMINANCE < THRESHOLD T1 | FIXED GAIN AMOUNT IS CALCULATED FROM REPRESENTATIVE LUMINANCE VALUE OF FACE SKIN REGION |
| FACE SKIN REGION LUMINANCE < THRESHOLD T0 | HAIR REGION LUMINANCE ≥ THRESHOLD T1 | FIXED GAIN AMOUNT IS CALCULATED FROM REPRESENTATIVE LUMINANCE VALUE OF HAIR REGION |
| FACE SKIN REGION LUMINANCE < THRESHOLD T0 | HAIR REGION LUMINANCE < THRESHOLD T1 | FIXED GAIN AMOUNT IS CALCULATED FROM HIGHER ONE OF REPRESENTATIVE LUMINANCE VALUES OF FACE SKIN REGION AND HAIR REGION |

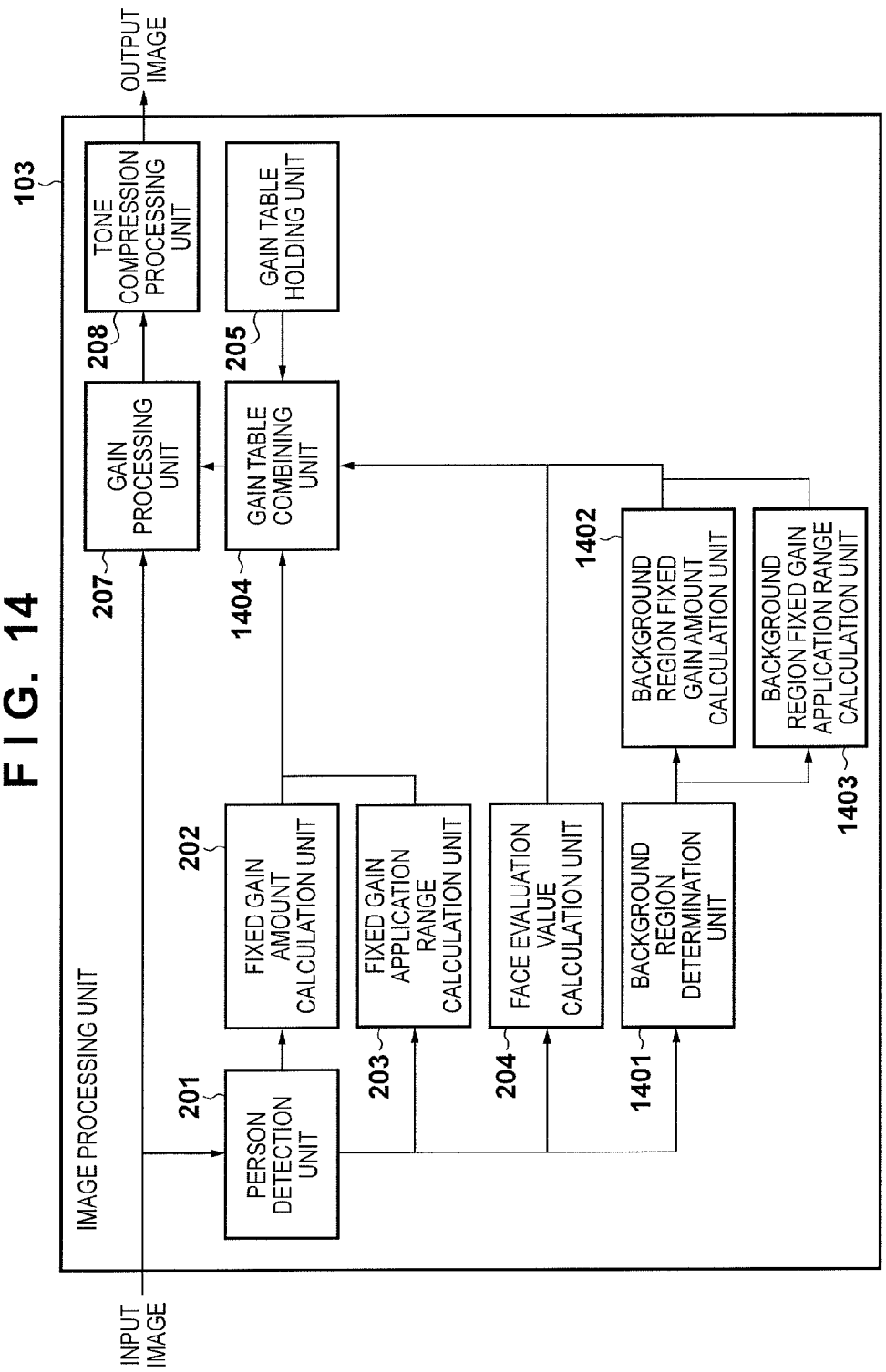

F I G. 17

| NUMBER OF PERSONS DETECTED | LUMINANCE DISTRIBUTION DIFFERENCE | GAIN TABLE TO BE SELECTED |
|---|---|---|
| NONE | — | GAIN TABLE STORED IN ADVANCE |
| ONE | \|BACKGROUND REGION − FACE REGION\| < THRESHOLD T3 | FACE REGION FIXED GAIN TABLE IS USED |
| ONE | \|BACKGROUND REGION − FACE REGION\| ≥ THRESHOLD T3 | GAIN TABLE OBTAINED BY PERFORMING WEIGHTED ADDITION OF FACE REGION FIXED GAIN TABLE AND BACKGROUND REGION FIXED GAIN TABLE WITH FACE EVALUATION VALUE |
| PLURALITY | \|BACKGROUND REGION − MAIN FACE REGION\| < THRESHOLD T3 | FIXED GAIN TABLE FOR FACE REGION OF MAIN FACE |
| PLURALITY | \|BACKGROUND REGION − MAIN FACE REGION\| ≥ THRESHOLD T3 | GAIN TABLE OBTAINED BY PERFORMING WEIGHTED ADDITION OF FIXED GAIN TABLE FOR FACE REGION OF MAIN FACE AND BACKGROUND REGION FIXED GAIN TABLE WITH FACE EVALUATION VALUE OF MAIN FACE |

IMAGE PROCESSING APPARATUS, IMAGE PROCESSING METHOD, AND STORAGE MEDIUM

BACKGROUND OF THE INVENTION

1. Field of the Invention

The present invention relates to a tone correction technique for captured images.

2. Description of the Related Art

There is known a technique of converting the luminance signals of a captured image and performing tone correction for the resultant signals to obtain an image with desired brightness. A captured image in a so-called backlit scene, in which the brightness of an object is considerably lower than that of a background, results in a dark object. A desired image is therefore obtained by performing tone correction to increase the brightness of the low-luminance portion. More specifically, as shown in FIG. 18, tone correction is performed to apply a higher gain to a captured image as the luminance of the image decreases. In this specification, such a tone correction technique is called partial contrast correction.

A problem in partial contrast correction is that applying a high gain to a low-luminance portion may decrease the light/dark contrast of the overall image. For example, when partial contrast correction is performed in a backlit scene with a dark object, the shade of the face region of a person is eliminated to result in a flat, low-contrast face. In addition, the hair region of a person with black hair is lower in luminance than the face region, and hence a high gain is applied to the hair region, resulting in an unnaturally bright region looking like white hair.

Under these circumstances, in order to solve the problem of a decrease in contrast, Japanese Patent Laid-Open No. 2011-100204 has proposed a technique of generating an image which secures the necessary brightness while imposing a limitation so as to prevent a low-luminance portion from becoming excessively bright by setting the upper limit value of the gain to be applied.

However, the related art disclosed in Japanese Patent Laid-Open No. 2011-100204 described above includes no description about gain control when a person exists. For this reason, this technique has the effect of reducing a decrease in contrast of an overall image, but cannot obtain an image with a person appearing correctly when a person is captured as an object.

SUMMARY OF THE INVENTION

The present invention has been made in consideration of the above problem, and generates an image properly tone-corrected in consideration of the degree of importance of a person when a captured image includes a person as an object.

According to the first aspect of the present invention, there is provided an image processing apparatus comprising: a detection unit configured to detect a person region included in an image; a first calculation unit configured to calculate first tone characteristics based on information concerning the person region detected by the detection unit; a second calculation unit configured to calculate second tone characteristics based on predetermined tone characteristics and the first tone characteristics calculated by the first calculation unit; and an image processing unit configured to perform tone correction processing by using the second tone characteristics calculated by the second calculation unit.

According to the second aspect of the present invention, there is provided an image processing apparatus comprising: a detection unit configured to detect a person region included in an image; a first calculation unit configured to calculate first tone characteristics based on information concerning the person region detected by the detection unit; and an image processing unit configured to generate a tone-corrected image by performing weighted addition of an image generated by predetermined tone characteristics and an image generated by first tone characteristics calculated by the first calculation unit.

According to the third aspect of the present invention, there is provided an image processing method comprising: a detection step of detecting a person region included in an image; a first calculation step of calculating first tone characteristics based on information concerning the person region detected in the detection step; a second calculation step of calculating second tone characteristics based on predetermined tone characteristics and the first tone characteristics calculated in the first calculation step; and an image processing step of performing tone correction processing by using the second tone characteristics calculated in the second calculation step.

According to the fourth aspect of the present invention, there is provided an image processing method comprising: a detection step of detecting a person region included in an image; a first calculation step of calculating first tone characteristics based on information concerning the person region detected in the detection step; and an image processing step of generating a tone-corrected image by performing weighted addition of an image generated by predetermined tone characteristics and an image generated by first tone characteristics calculated in the first calculation step.

Further features of the present invention will become apparent from the following description of exemplary embodiments with reference to the attached drawings.

BRIEF DESCRIPTION OF THE DRAWINGS

FIG. 13 is a view showing an example of combinations of the relationships between the luminances of face skin regions and the luminances of hair regions and fixed gain amount calculation methods;

FIG. 14 is a block diagram showing the arrangement of an image processing unit 103 according to the second embodiment;

FIG. 17 is a view showing an example of combinations of the relationships in difference between the luminance distributions of face regions and the luminance distributions of background regions and fixed gain tables to be selected.

DESCRIPTION OF THE EMBODIMENTS

The embodiments of the present invention will be described in detail below with reference to the accompanying drawings.

First Embodiment

Figure 1:
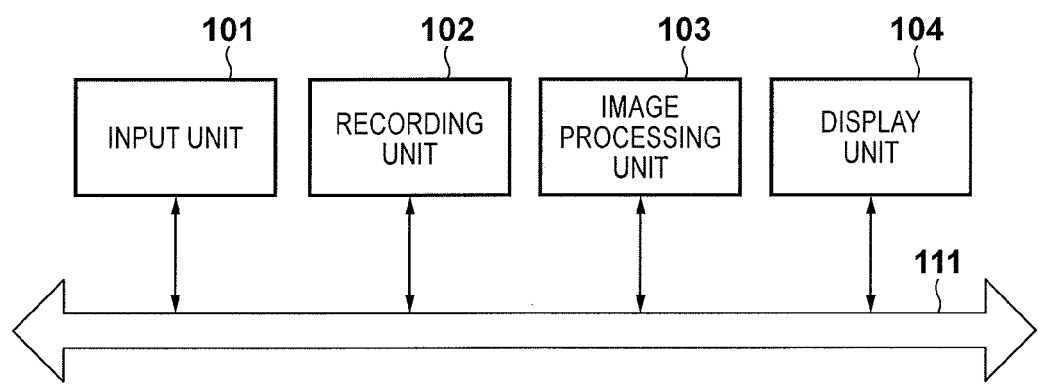
FIG. 1 is a block diagram showing the arrangement of an image processing apparatus according to the first embodiment of the present invention.

FIG. 1 is a block diagram showing the arrangement of an image processing apparatus according to the first embodiment of the present invention. Referring to FIG. 1, an input unit 101 is a device which inputs instructions (operations) from the user and data, and includes, for example, a keyboard and a pointing device. Note that the pointing device includes a mouse, a trackball, and a tablet. Alternatively, if, for example, this device is applied to a known digital camera apparatus, the device may be constituted by buttons, a mode dial, and the like.

A recording unit 102 is a portion holding image data, and is formed from a hard disk, a CD-ROM or CD-R, a memory card, a CF card, a smart medium, an SD card, a memory stick, or the like. The recording unit 102 can also hold programs and other data.

An image processing unit 103 performs tone correction (tone characteristic correction) for an input image. This processing will be described in detail later.

A display unit 104 is formed from a liquid crystal display or organic EL (Electro Luminescence) display, and displays an image before or after image processing or an image such as a GUI. Alternatively, this display unit may be an external display device connected to the image processing apparatus via a cable or the like.

A system bus 111 mutually connects the respective units 101 to 104 to a control unit so as to make them communicable with each other. Although not shown, an image capturing unit including a known CCD may be provided, and the images captured by the image capturing unit may be stored in the recording unit 102.

Figure 2:
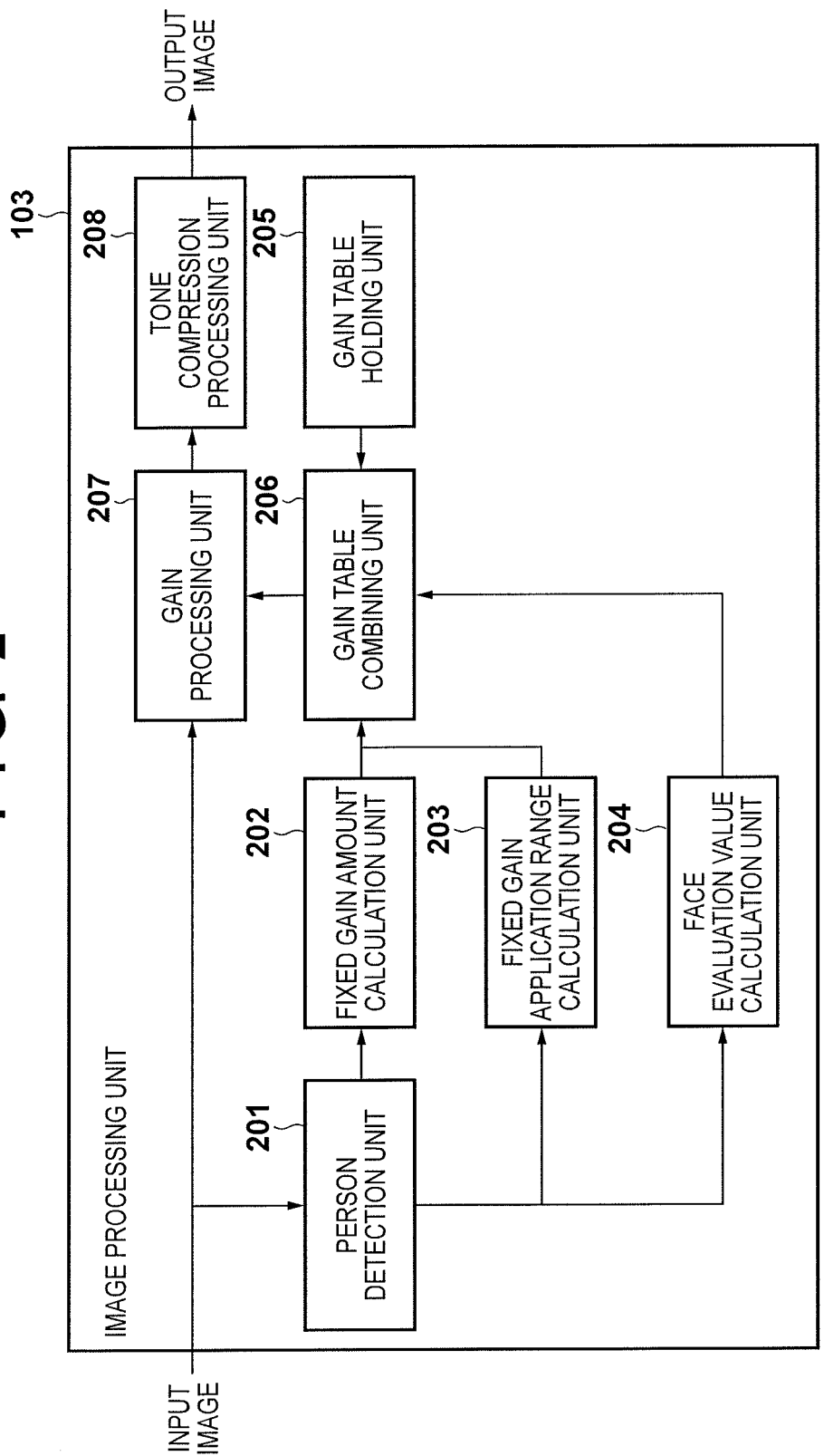
FIG. 2 is a block diagram showing the arrangement of an image processing unit 103 according to the first embodiment.
Figure 3:
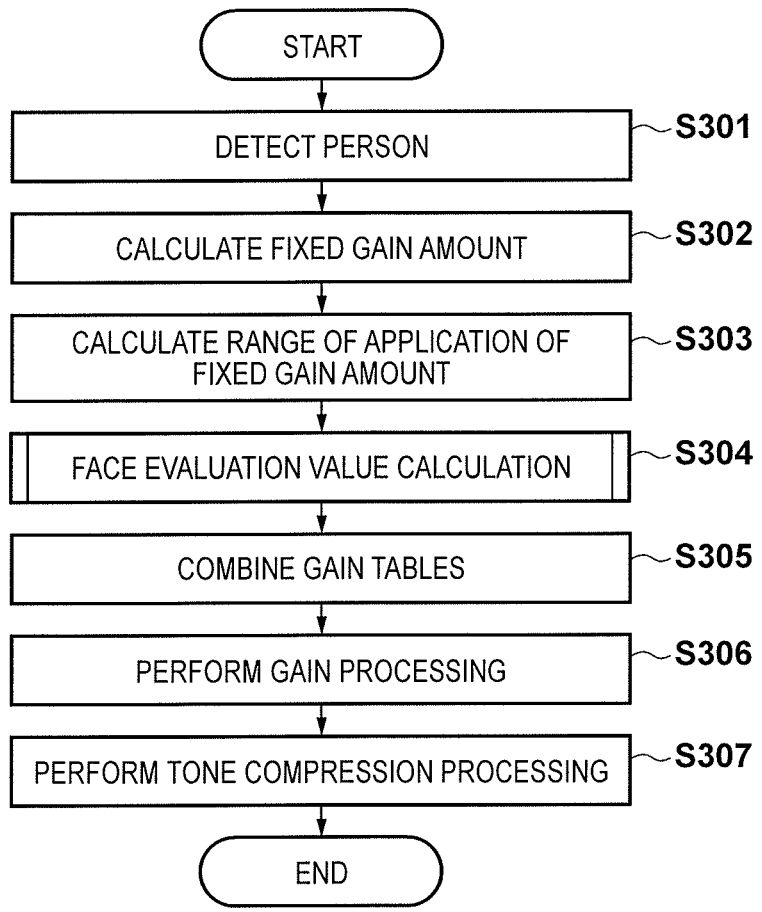
FIG. 3 is a flowchart showing a procedure for processing by the image processing unit 103 according to the first embodiment.

FIG. 2 is a block diagram showing an example of a concrete arrangement associated with tone correction processing in the image processing unit 103. FIG. 3 is a flowchart corresponding to the block diagram of FIG. 2. Tone correction processing in the image processing unit 103 according to this embodiment will be described with reference to the block diagram of FIG. 2 and the flowchart of FIG. 3. In the following description of tone correction processing, image data as data to be subjected to tone correction processing will also be referred to as an image.

Figure 4:
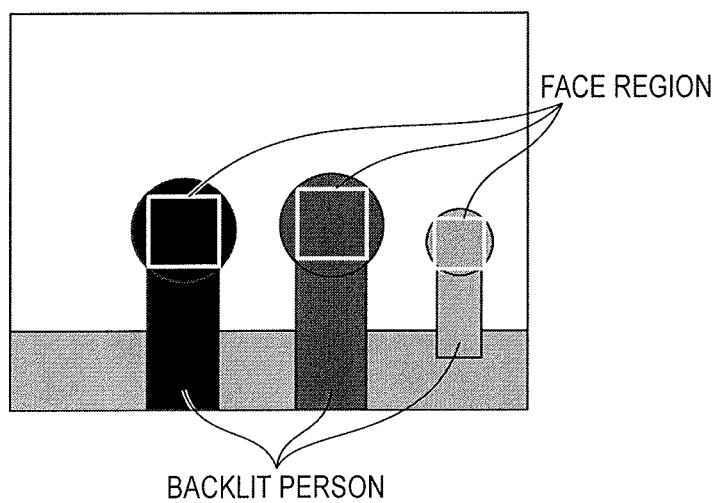
FIG. 4 is a view showing an input image according to the first embodiment.

First of all, when tone correction processing starts, a person detection unit 201 detects persons on an input image in step S301. FIG. 4 shows the image input in this embodiment. The input image in FIG. 4 shows a scene in which a plurality of persons in a backlit state exist.

As a method of detecting persons, face detection processing is performed for an image to calculate the sizes, positions, and reliabilities of faces in the image. The face regions in FIG. 4 represent the sizes and positions of the faces as face detection results. The face detection method to be used is not specifically limited, and an arbitrary known method can be used. Known techniques include a technique based on learning using a neural network and the like and a technique of searching an image for portions having characteristic shapes such as the eyes, noses, and mouths by using template matching and regarding portions exhibiting high similarities as faces. When using such a technique, it is possible to use similarities as reliabilities. In addition, when performing face detection processing for an image, the excessive brightness or darkness of the image may degrade the accuracy of face detection. For this reason, based on the brightness of an image subjected to face detection processing, a reliability may be increased with an increase in brightness which increases the accuracy of face detection.

In addition, it is possible to use another person detection method of calculating the sizes, positions, and reliabilities of human bodies in an image by performing human body detection processing as a known technique. The face of a person in a backlit state, in particular, is sometimes too dark to recognize characteristic portions of the face. However, it is possible to detect a human body from the overall shape of the human body. The size and position of a face are calculated from the size and position of the detected human body. Since a method of calculating a face region from a human body detection result is described in, for example, Japanese Patent Laid-Open No. 2011-210238, a detailed description of the method will be omitted.

It is also possible to use a method of displaying an image on the display unit 104 and making the user designate the range of a portion on the displayed image via the input unit 101 as well as the above method of automatically detecting from an image.

In step S302, a fixed gain amount calculation unit 202 calculates a fixed gain amount used for tone correction with respect to all the faces detected in step S301. First of all, the fixed gain amount calculation unit 202 calculates the representative luminance value of each detected face region. Assume that in this embodiment, the average luminance (average luminance value) of a face region is used as a representative luminance value.

Letting Y_FACE be the representative luminance value of a face region and Y_REF be the target luminance value of a person, which is set in advance, a fixed gain amount GAIN_FACE is calculated by $$\text{GAIN\_FACE} = Y\_\text{REF}/Y\_\text{FACE} \quad (1)$$

In this case, in this embodiment, any gain amount less than equal size (1×) is not applied. If, therefore, the fixed gain amount calculated by equation (1) is less than equal size, the calculated amount is regarded as equal size (1×).

Note that a known color space conversion method is used as a luminance signal calculation method. For example, if an input image is an RGB image, a luminance signal Y is calculated by $$Y = 0.299 \times R + 0.587 \times G + 0.114 \times B \quad (2)$$

Note that a representative luminance value may be the mode value or maximum value in a region as well as an average value.

In step S303, a fixed gain application range calculation unit 203 determines the luminance range of the application of the fixed gain amount calculated in step S302 in accordance with the luminance of each face region. For the sake of descriptive convenience, assume that the range of the application of a fixed gain amount is called FACE_POINT.

In this embodiment, the range of the application of a fixed gain amount is determined by using the luminance histogram of each face region. A concrete content will be described with reference to FIG. 5.

Figure 5:
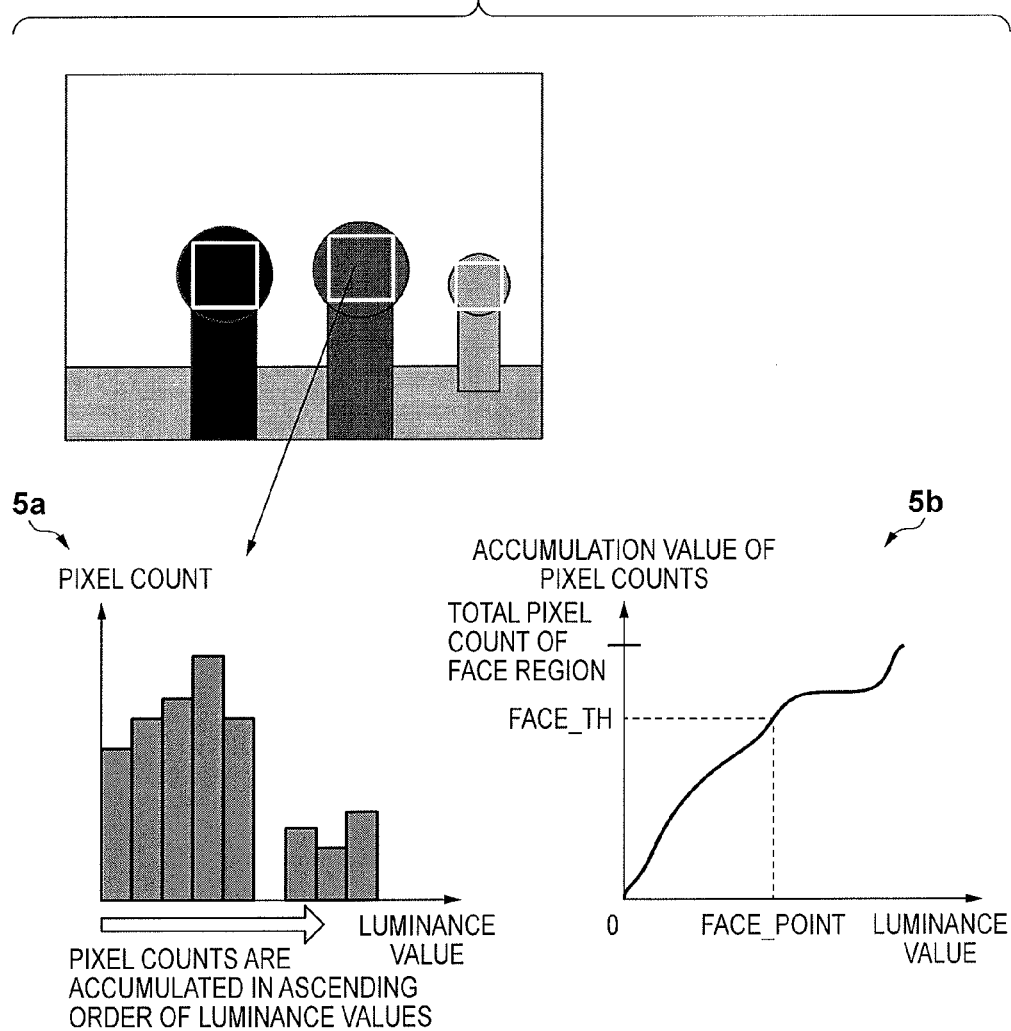
FIG. 5 is a view for explaining a method of calculating FACE_POINT.

First of all, as indicated by 5a in FIG. 5, the luminance histogram of a face region is calculated. Pixel counts are sequentially accumulated in ascending order to the luminance values of the histogram. As indicated by 5b in FIG. 5, when the accumulation value of the pixel counts becomes equal to or more than a predetermined threshold (FACE_TH), the luminance value obtained by finally adding the pixel count is set as FACE_POINT.

In this case, the above threshold (FACE_TH) can be expressed by $$FACE\_TH = FACE\_ALLAREA \times P\_FACE \quad (3)$$

FACE_ALLAREA and P_FACE respectively represent the total pixel count of the face region and an adjustment parameter. FACE_POINT is determined depending on what percentage of the total pixel count the accumulation value of pixel counts has reached. Note that the method of determining the range of the application of a fixed gain amount is not limited to the method using histograms, and the range may be determined from the average luminance value or maximum luminance value of a face region.

Figure 6:
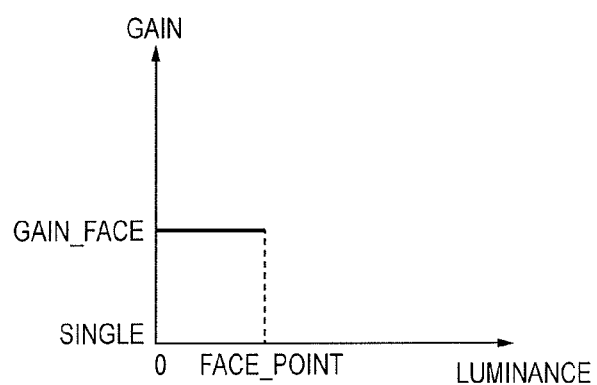
FIG. 6 is a schematic view of a fixed gain table.

In the processing in steps S302 and S303, as indicated by equation (4), a fixed gain table GAINTABLE_FACE used for tone correction is calculated for each face. FIG. 6 is a schematic view showing a gain table.

$$GAINTABLE\_FACE(Yin) = GAIN\_FACE \quad (4)$$

(where $0 \leq Yin \leq FACE\_POINT$)

In equation (4), Yin represents the luminance to be input. If, for example, the signal range is 8 bits, Yin can take values from 0 to 255.

In step S304, face evaluation values representing the degrees of importance of faces are calculated with respect to all the faces detected in step S301. The face evaluation values are used as weights for weighted addition of the fixed gain table GAINTABLE_FACE described above and a conventional partial contrast correction gain table when calculating a gain table used for tone correction in step S305.

A face evaluation value calculation unit 204 calculates face evaluation values with respect to all the faces detected in step S301. When calculating face evaluation values, the face evaluation value calculation unit 204 uses the sizes, positions, and reliabilities of the faces calculated at the time of face detection.

In this case, when a plurality of persons is shot, face evaluation values are determined by assuming the following use cases:

Use Case 1: A shot image of the face of a main person is larger than a predetermined size.

Use Case 2: A shot image of the face of a main person is located near the center.

Use Case 3: The face of a main person exhibits a high reliability.

Figure 7:
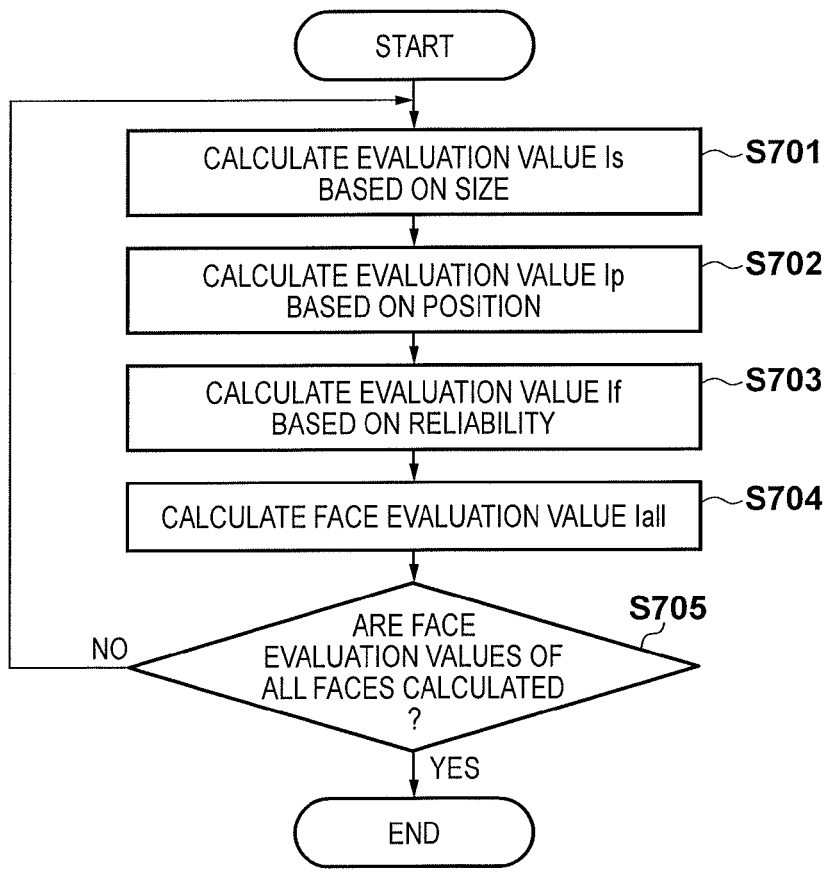
FIG. 7 is a flowchart showing a procedure for face evaluation value calculation according to the first embodiment.

FIG. 7 is a flowchart for face evaluation value calculation. This processing will be described below with reference to the flowchart of FIG. 7.

Figure 8:
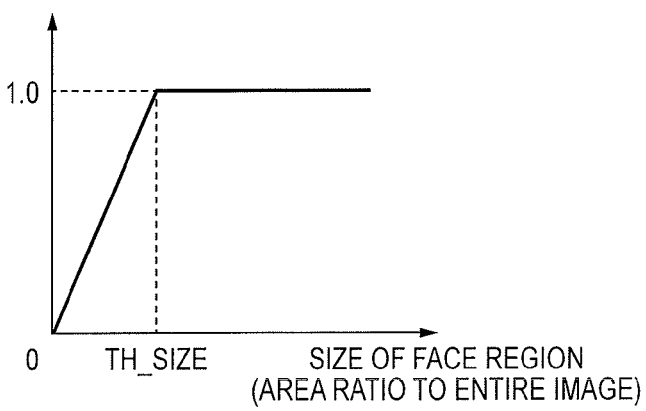
FIG. 8 is a graph showing an example of the correspondence relationship between the sizes of face regions and evaluation values based on the sizes.

In step S701, an evaluation value Is is determined based on the size of a face region. This operation corresponds to use case 1. FIG. 8 is a graph showing an example of the correspondence relationship between the size of a face region and the evaluation value Is based on the size of the face region. In the graph of FIG. 8, the abscissa represents the area ratio of a face region to the entire image, and the ordinate represents the evaluation value Is based on the size of the face region. For example, a person with a face depicted in an image in a size equal to or larger than a certain ratio (TH_SIZE) is important, whereas persons with faces depicted in smaller sizes decrease in the degree of importance with decreases in the above ratio.

Note that this embodiment is intended to calculate the evaluation value of a face region in accordance with the area of the face region. Therefore, the correspondence relationship expressed by the graph of FIG. 8 is an example, and the correspondence relationship to be used may be the one expressed by another graph.

Figure 9:
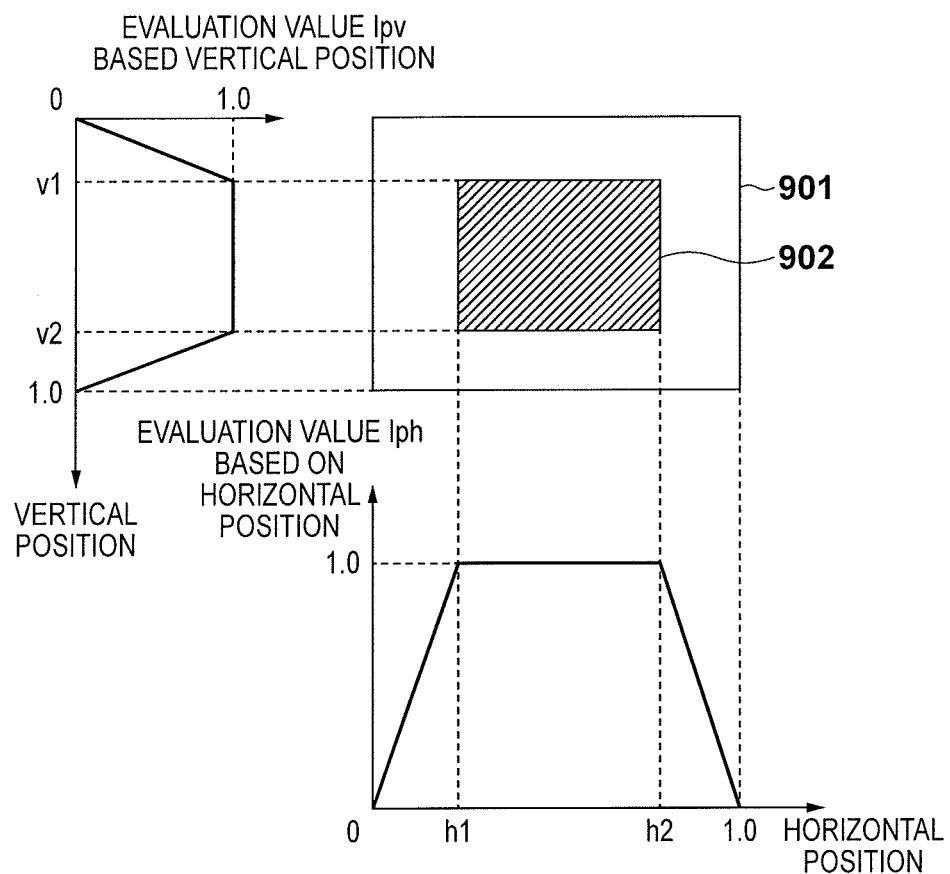
FIG. 9 shows graphs each showing an example of the correspondence relationship between the position of a face region and an evaluation value based on the position.

In step S702, an evaluation value Ip is determined based on the position of a face region. This operation corresponds to use case 2. FIG. 9 shows graphs each showing an example of the correspondence relationship between the position of a face region and the evaluation value Ip based on the position.

Referring to FIG. 9, reference numeral 901 denotes an input image region; and 902, a predetermined region defined by (h1, v1)–(h2, v2), in which the face of a main person is expected to be depicted. In addition, the graph on the lower side in FIG. 9 shows the correspondence relationship between the position of a region of interest in the horizontal direction and an evaluation value, and the graph on the left side in FIG. 9 shows the correspondence relationship between the position of the region of interest in the vertical direction and an evaluation value. For the sake of descriptive convenience, the positions in the horizontal and vertical directions are respectively normalized by the width and height of the image.

First of all, with regard to the positional coordinates on the face detected by face detection in step S301, an evaluation value Ipv at the vertical position and an evaluation value Iph at the horizontal position are respectively calculated from the correspondence relationship between positions and evaluation values represented by the horizontal and vertical graphs shown in FIG. 9. The evaluation value Ip based on the position is calculated from the evaluation value Ipv based on the vertical position and the evaluation value Iph based on the horizontal position. Assume that in this embodiment, the evaluation value Ip based on the position is calculated by multiplying Ipv and Iph.

Note that this embodiment is intended to calculate the evaluation value of a face region in accordance with the position of the face region. Therefore, the correspondence relationship expressed by each of the graphs of FIG. 9 is an example, and the correspondence relationship to be used may be the one expressed by another graph.

In addition, in this embodiment, the evaluation value Ip based on the position is obtained by multiplying the evaluation value Ipv based on the vertical position and the evaluation value Iph based on the horizontal position. However, the embodiment is not limited to this. For example, the evaluation value Ip based on the position may be obtained from the maximum values, minimum values, or average values of the evaluation value Ipv based on the vertical position and the evaluation value Iph based on the horizontal position.

In step S703, an evaluation value If based on the reliability of a face region is determined. This operation corresponds to use case 3. Assume that the higher the reliability, the higher the possibility of being a face. If, for example, a reliability is normalized like [0, 1.0] or [0, 100], the reliability is normalized again to [0, 1.0], as needed, and the resultant value is output as If.

If reliabilities are not normalized, a maximum value FACEmax of the reliabilities of all face regions is obtained, and the normalized value obtained by dividing the reliability of each face region by FACEmax, that is, FACE/FACEmax, is output as the evaluation value If of each face region. In this case, FACE represents the reliability of each face region.

In step S704, a final face evaluation value Iall is determined from the respective evaluation values determined in steps S701, S702, and S703. Iall is calculated by $$Iall = Is \times Ip \times If \qquad (5)$$

Note that the equation to be used in the face evaluation value calculation method is not limited to the above equation. For example, a face evaluation value may be determined from, for example, the maximum, minimum, or average value of the respective evaluation values. Alternatively, a weight may be determined in advance for each evaluation value, and a face evaluation value may be obtained by weighted averaging. Alternatively, a face evaluation value may be calculated from at least one of the evaluation value Is, the evaluation value Ip, and the evaluation value If.

In step S705, it is determined whether face evaluation values are calculated with respect to all the faces in the input image. If NO in step S705, the process returns to step S701 to continue the processing. If YES in step S705, the processing is terminated.

The face evaluation value calculation in step S304 has been described so far, and the description thereof is ended. The processing will be described again by referring back to FIG. 3.

In step S305, a gain table combining unit 206 combines gain tables used for tone correction. When combining gain tables, the gain table combining unit 206 refers to the fixed gain table GAINTABLE_FACE for each face region, calculated in steps S302 and S303, and the face evaluation value Iall of each face region calculated in step S304. In addition, the gain table combining unit 206 also refers to the gain table for tone correction by partial contrast correction processing, which is stored in a gain table holding unit 205 in advance. For the subsequent description, the gain table stored in the gain table holding unit 205 in advance and the gain table calculated by combining operation will be respectively referred to as GAINTABLE_PRE and GAINTABLE_MIX.

Figure 18:
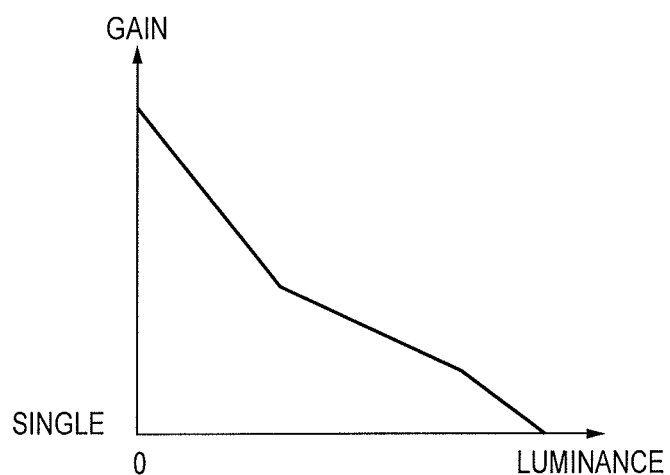
FIG. 18 is a schematic view of a gain table used for partial contrast correction.

GAINTABLE_PRE will be described first. The gain table GAINTABLE_PRE stored in advance is the gain table used for the conventional partial contrast correction technique shown in FIG. 18, and has characteristics that as the luminance of an input image decreases, a higher gain is multiplied. Since the manner of determining a gain table in the related art has been described in, for example, Japanese Patent Application No. 2009-093350, a detailed description will be omitted.

GAINTABLE_FACE, of GAINTABLE_FACE calculated for each face region, which is used for the calculation of GAINTABLE_MIX is determined. Assume that this embodiment uses GAINTABLE_FACE for a face region having the face evaluation value Iall equal to or more than a predetermined threshold and the highest average luminance among those of the face regions. This is because any face region with the face evaluation value Iall less than a preset threshold is low in possibility of being a main person, and hence need not be regarded as a tone correction target in consideration of user's intention for image shooting. If a face region exhibiting the maximum average luminance among those of a plurality of detected persons is set as a reference for tone correction, the fixed gain amount to be set decreases. This can avoid the harmful phenomena, which have been problems in the conventional partial contrast correction technique, in which the shade of the face region of a person is eliminated to result in a low-contrast face, and black hair changes to white hair.

Finally, GAINTABLE_MIX is calculated by combining GAINTABLE_PRE with GAINTABLE_FACE selected as the reference by weighted addition. Weighted addition is performed by $$GAINTABLE\_MIX(Yin) = GAINTABLE\_FACE(Yin) \times Iall + GAINTABLE\_PRE(Yin) \times (1.0 - Iall) \qquad (6)$$

(where $0 \leq Yin \leq FACE\_POINT$)

Figure 10:
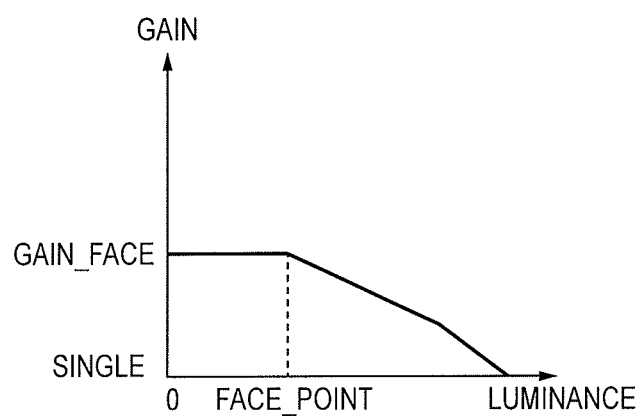
FIG. 10 is a schematic view of a gain table (GAINTABLE_MIX) used for tone correction.

Yin in equation (6) represents the luminance to be input. Assume that GAINTABLE_MIX corresponding to a luminance in a range larger than FACE_POINT is equal to GAINTABLE_PRE. FIG. 10 shows GAINTABLE_MIX in a case in which the face evaluation value Iall is 1.0. In order to prevent the occurrence of pseudo-contours in tones after tone correction, GAINTABLE_MIX is desired to smoothly change. For this reason, if GAINTABLE_FACE(Yin) < GAINTABLE_PRE(Yin) holds in the range of $0 \leq Yin \leq 5$ FACE_POINT, it is preferable to smoothly change GAINTABLE_MIX by, for example, setting the average value of the two gain tables to GAINTABLE_MIX(Yin).

Note that if no person is detected in step S301, GAINTABLE_MIX is equal to GAINTABLE_PRE.

In this embodiment, GAINTABLE_FACE of a face region exhibiting the maximum average luminance among the face regions of a plurality of detected persons is selected. However, the embodiment is not limited to this. For example, mode names may be displayed on the display unit 104, and the user may select GAINTABLE_FACE from the displayed modes in accordance with the mode designated by the user via the input unit 101. If, for example, the mode name is low-luminance-person-priority tone correction, and the user selects the mode, GAINTABLE_FACE of a face region with the minimum representative luminance value among detected face regions is selected. On the other hand, for example, if the mode name is person-priority tone correction (brightness designation), GAINTABLE_FACE of a face region having a representative luminance value nearest to the luminance value input by the user is selected.

In step S306, a gain processing unit 207 performs tone correction for the luminance signal of the input image based on the gain table GAINTABLE_MIX used for tone correction which is calculated in step S305.

Figure 11:
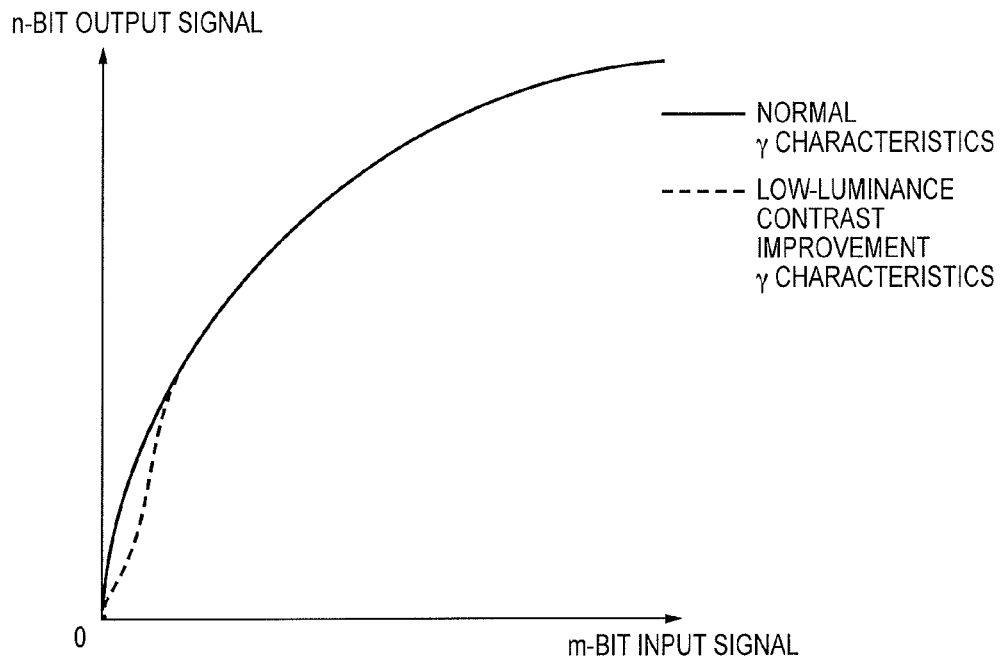
FIG. 11 is a graph for explaining tone compression processing based on γ characteristics.

In step S307, tone compression processing complying with γ characteristics is performed for an m-bit signal having undergone gain processing in step S306 in accordance with a display device to output an n (n≤m)-bit signal. The normal γ characteristics are indicated by the solid curve in FIG. 11. In addition, it is possible to use γ characteristics which improve the contrast of a low-luminance portion (enhance the contrast), like the γ characteristics indicated by the dotted line. The γ characteristics indicated by the dotted line are effective as a countermeasure against the problem that the face region of a backlit person, in particular, decreases in contrast because of the influence of flare.

As described above, in this embodiment, when a dark person exists in a captured image as in a backlit scene (backlit determination), a gain table is calculated in consideration of the face region luminance of the person. This can avoid the phenomenon in which the shade of the face region of the person is eliminated as in the conventional partial contrast correction technique to result in a flat, low-contrast face. This can also avoid the phenomenon in which a higher gain is applied to the hair region of a person with black hair than to the face region to result in a change to white hair with unnatural brightness. It is possible to generate an image tone-corrected to proper brightness while avoiding these phenomena.

Note that this embodiment performs tone correction by using the gain table obtained by performing weighted addition of a gain table considering the face region luminances of persons and a gain table for conventional partial contrast correction. However, it is possible to use a method in which images are generated first by performing tone correction using a gain table considering the face region luminances of persons and by performing tone correction using a gain table for conventional partial contrast correction, and weighted addition is then performed with respect to the images after tone correction.

Figure 12:
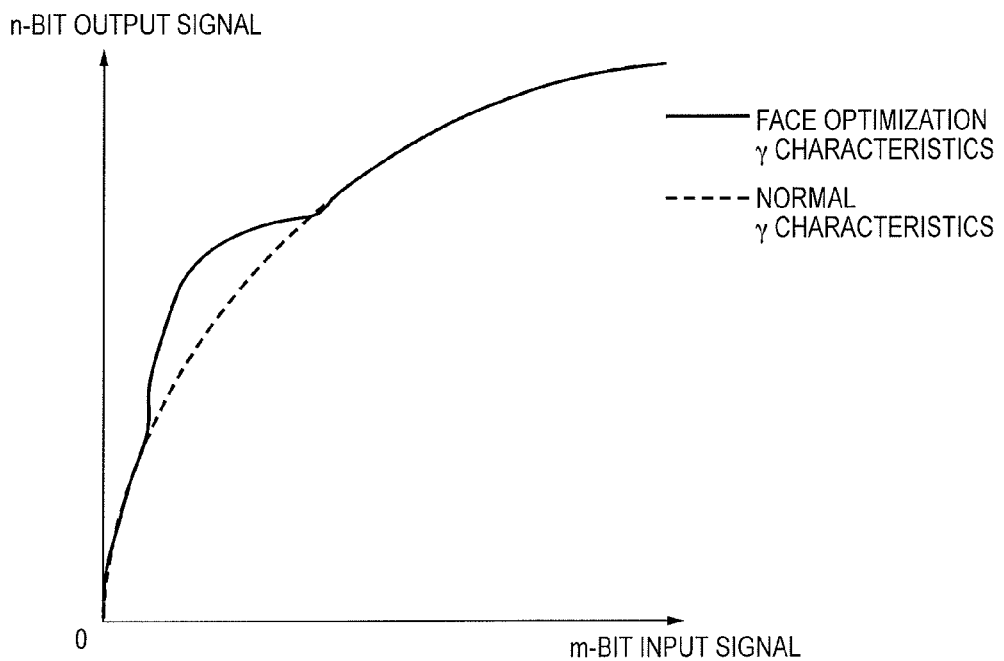
FIG. 12 is a graph for explaining tone compression processing based on γ characteristics which optimize a face.

In addition, the effect of this embodiment can be obtained by an arrangement configured to perform tone compression processing with γ characteristics which optimize the brightness of a main person as indicated by the solid line in FIG. 12 while setting a gain amount for tone correction to equal size, that is, performing no tone correction.

It is determined whether the person detected by person detection in step S301 is in a backlit state, by using a known technique (Japanese Patent Laid-Open No. 2004-200808) of determining a backlit scene. A face region to be referred to when combining gain tables in step S305 may be limited to a person in a backlit state. This arrangement can reduce a computation load.

In addition, a technique (Japanese Patent Laid-Open No. 2011-141622) of detecting the hair region of a person, which is a known technique, may be used to switch fixed gain amount GAIN_FACE calculation methods depending on the relationship between the luminance of a face skin region and the luminance of a hair region. FIG. 13 shows an example of combinations for switching. In this case, first of all, a detected face skin region and a detected hair region are respectively compared with thresholds T0 and T1 to determine whether these regions are bright. If it is determined that the luminance of the face skin region is equal to or more than the threshold T0, and the luminance of the hair region is equal to or more than the threshold T1, a fixed gain amount is calculated from a larger one of the representative luminance values of the face skin region and the hair region.

On the other hand, if it is determined that the luminance of the face skin region is equal to or more than the threshold T0, and the luminance of the hair region is less than the threshold T1, a fixed gain amount is calculated from the representative luminance value of the face skin region. In addition, if it is determined that the luminance of the face skin region is less than the threshold T0, and the luminance of the hair region is equal to or more than the threshold T1, a fixed gain amount is calculated from the representative luminance value of the hair region. Furthermore, if it is determined that the luminance of the face skin region is less than the threshold T0, and the luminance of the hair region is less than the threshold T1, a fixed gain amount is calculated from a larger one of the representative luminance values of the face skin region and the hair region.

This arrangement prevents a high gain from being applied to a low-luminance region and hence can suppress, for example, the phenomenon in which a higher gain is applied to a low-luminance black hair region than to a face skin region to result in a change from black hair to white hair. In addition, if an oriental person who tends to exhibit high luminance because of black hair is detected by a (race determination) technique (Japanese Patent Laid-Open No. 2005-266981) of estimating a race, which is a known technique, a fixed gain amount may be calculated from the representative luminance value of the face skin region.

Second Embodiment

The second embodiment of the present invention will be described below, mainly concerning differences from the first embodiment, while a description of points common to the first embodiment will be omitted.

In the first embodiment, when a person exists in an input image, tone correction processing is performed with priority on the person. However, setting a tone correction amount with priority on a high-luminance person will reduce the tone correction effect on a region other than the person region, which has been obtained by conventional partial contrast correction processing. For the sake of description convenience, a region other than a person region is called a background region.

In the second embodiment, the luminance distribution of the face region of a person (person luminance distribution calculation) is compared with the luminance distribution of the background region (background luminance distribution calculation). If the luminance distributions are almost the same, the fixed gain table calculated from the luminance of the face region is used to calculate a gain table used for final tone correction. If the luminance distributions greatly differ from each other, a fixed gain table is calculated by performing weighted addition of the fixed gain table calculated from the luminance of the face region and the fixed gain table calculated from the luminance of the background region with a face evaluation value. Described below is a method of preventing the tone correction effect on a background region from being unintentionally reduced by using a calculated fixed gain table for the calculation of a gain table used for final tone correction.

Figure 15:
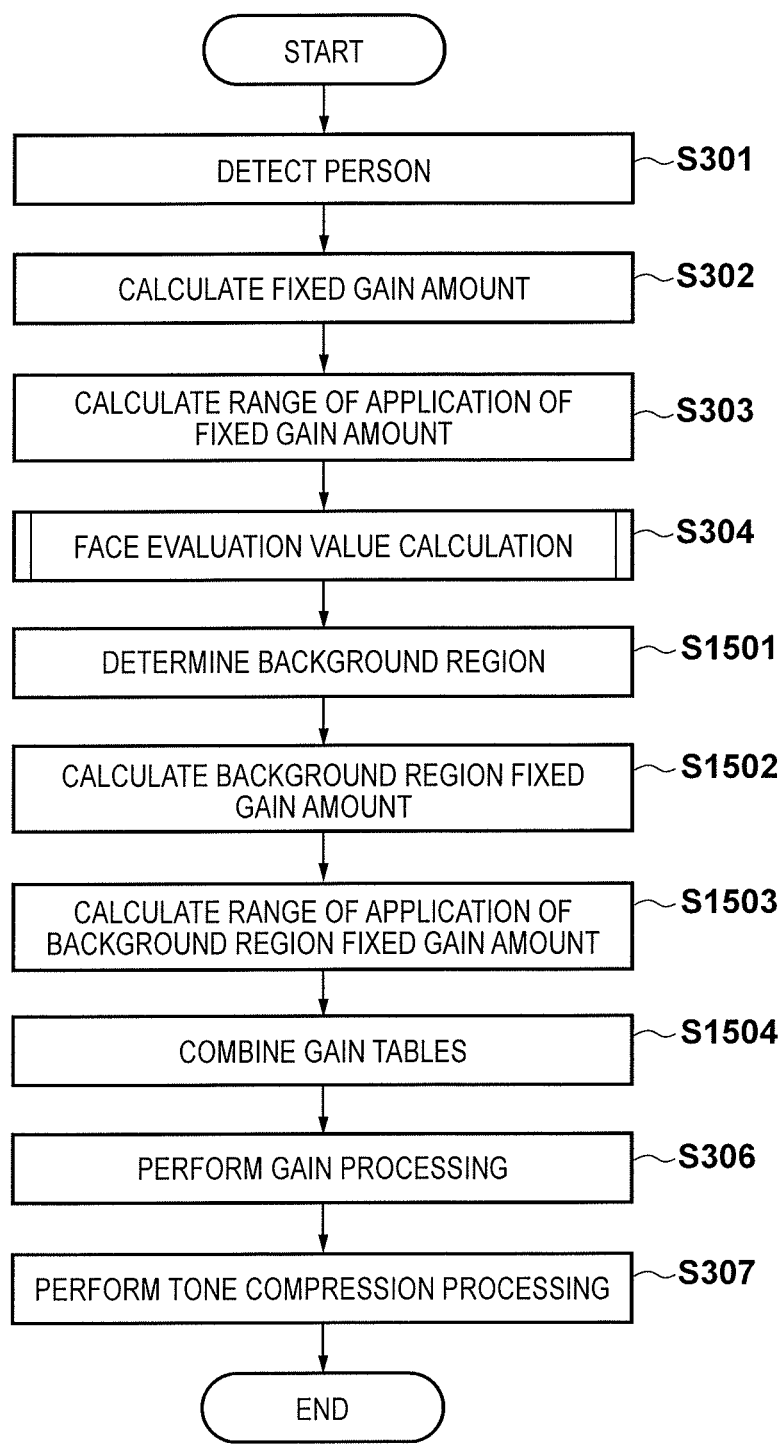
FIG. 15 is a flowchart showing a procedure for processing by the image processing unit 103 according to the second embodiment.

FIG. 14 is a block diagram showing a concrete arrangement associated with tone correction processing according to this embodiment. The block diagram shown in FIG. 14 differs from that shown in FIG. 2 in the first embodiment concerning the following point. This arrangement includes a background region determination unit 1401, a background region fixed gain amount calculation unit 1402, and a background region fixed gain application range calculation unit 1403, and the reference numeral denoting a gain table combining unit is changed to 1404 because the processing content differs from that in the first embodiment. FIG. 15 is a flowchart corresponding to the block diagram of FIG. 14. The flowchart shown in FIG. 15 differs from the flowchart shown in FIG. 3 in the first embodiment in that steps S1501 to S1503 are added after step S304, and step S305 is changed to step S1504. Additions and changes in the flowchart of FIG. 15 from that of FIG. 3 will be described below. Note that in the following description of tone correction processing, image data as data to be subjected to tone correction processing will also be called an image.

Figure 16:
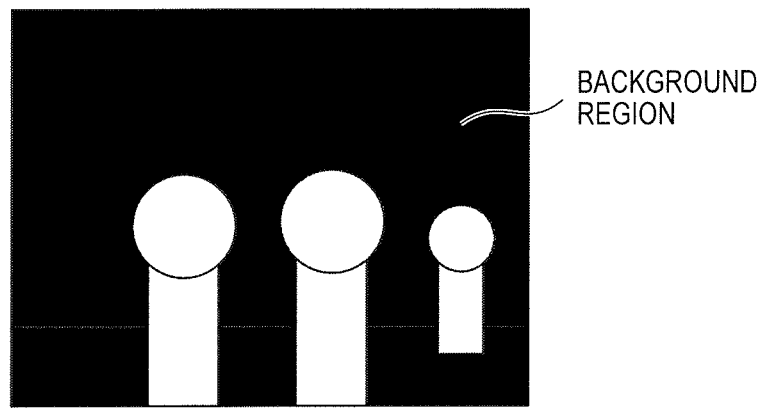
FIG. 16 is a view for explaining a background region according to the second embodiment.

In step S1501, the background region determination unit 1401 determines a background region in an input image. Assume that in this embodiment, a region other than the person region detected in step S301 is regarded as a background region as indicated by the black region in FIG. 16.

In step S1502, the background region fixed gain amount calculation unit 1402 calculates a fixed gain amount used for tone correction with respect to the background region determined in step S1501. The background region fixed gain amount calculation unit 1402 calculates a fixed gain amount (GAIN_BACK) for the background region by using a representative luminance value (Y_BACK) of the background region and a predetermined target luminance value (Y_BACK_REF) for the background region according to the following equation:

$$GAIN\_BACK = Y\_BACK\_REF / Y\_BACK \qquad (7)$$

In addition, the weighted average value obtained by using weights corresponding to the average luminance and coordinates of the background region is used as the representative luminance value of the background region.

In step S1503, the background region fixed gain application range calculation unit 1403 determines the range of the application of the background region fixed gain amount calculated in step S1501 in accordance with the luminance of the background region. This determination method is the same as that in step S303, and hence a detailed description of the method will be omitted.

In step S1504, the gain table combining unit 1404 combines gain tables used for tone correction. This step differs from step S305 in that a fixed gain table is selected in accordance with the difference between the luminance distribution of the face region and the luminance distribution of the background region. In this case, luminance distributions are those obtained by normalizing the histograms of the face region and the background region with pixel counts. FIG. 17 shows an example of combinations for switching.

Referring to FIG. 17, if no person is detected in step S301, a gain table GAINTABLE_MIX used for final tone correction is identical to a gain table GAINTABLE_PRE held in a gain table holding unit 205 in advance.

On the other hand, if only one person is detected in step S301, and the difference between the luminance distribution of the background region and the luminance distribution of the face region is less than a preset threshold T3, that is, the brightness of the face region is near that of the background region, a face region fixed gain table is selected. The gain table GAINTABLE_MIX used for final tone correction is calculated by performing weighted addition of the selected face region fixed gain table and the gain table GAINTABLE_PRE stored in the gain table holding unit 205, with the face evaluation value being a weight.

If only one person is detected in step S301, and the difference between the luminance distribution of the background region and the luminance distribution of the face region is equal to or more than the preset threshold T3, that is, the brightness of the face region differs from that of the background region, the following operation is performed. That is, weighted addition is performed with respect to the face region fixed gain table and the background region fixed gain table with the face evaluation value. The gain table GAINTABLE_MIX used for final tone correction is then calculated by performing weighted addition of the gain table calculated by weighted addition and the gain table GAINTABLE_PRE stored in the gain table holding unit 205 in advance with a weight of 1.0 being set for the background region fixed gain table. That is, this gain table is always used in the range of the application of the background region fixed gain table. This gives priority to tone correction for the background region if the face evaluation value of the person is low. This makes it possible to obtain an image corrected to have proper brightness without reducing the tone correction effect on a background region which has been obtained by conventional partial contrast correction processing.

If a plurality of persons are detected in step S301, this embodiment uses a fixed gain table for a person exhibiting the maximum face evaluation value. In this case, a person exhibiting the maximum face evaluation value will be called a main face. If the difference between the luminance distribution of the background region and the luminance distribution of the face region of the main face is less than the preset threshold T3, the fixed gain table for the face region of the main face is selected. The gain table GAINTABLE_MIX used for final tone correction is then calculated by performing weighted addition of the selected fixed gain table for the face region of the main face and the gain table GAINTABLE_PRE stored in the gain table holding unit 205 in advance with the face evaluation value of the main face being a weight.

On the other hand, if the difference between the luminance distribution of the background region and the luminance distribution of the face region of the main face is equal to or more than the preset threshold T3, weighted addition is performed with respect to the fixed gain table for the face region of the main face and the background region fixed gain table with the face evaluation value. The gain table GAINTABLE_MIX used for final tone correction is then calculated by performing weighted addition of the gain table calculated by weighted addition and the gain table GAINTABLE_PRE stored in the gain table holding unit 205 in advance with a weight of 1.0 being set for the background region fixed gain table.

Note that in this embodiment, when a plurality of persons are detected, a fixed gain table for a person exhibiting the maximum face evaluation value is used. However, the embodiment is not limited to this. For example, the embodiment may be configured to select a fixed gain table for a person exhibiting the highest average luminance among the plurality of persons or a fixed gain table for a person exhibiting the lowest average luminance.

This embodiment can obtain an image corrected to have proper background brightness in accordance with a scene while preventing the tone correction effect on the background region being unintentionally reduced, as compared with the first embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-225816, filed Oct. 30, 2013, which is hereby incorporated by reference herein in its entirety.

What is claimed is:

1. An image processing apparatus comprising:
at least one hardware processor or circuit implementing the functions of a detection unit, a first calculation unit, a second calculation unit and an image processing unit, wherein:
the detection unit is configured to detect a person region included in an image;
the first calculation unit is configured to calculate first tone characteristics based on information concerning the person region detected by said detection unit;
the second calculation unit is configured to calculate second tone characteristics based on predetermined tone characteristics and the first tone characteristics calculated by said first calculation unit; and
the image processing unit is configured to perform tone correction processing by using the second tone characteristics calculated by stud second calculation unit.

2. The apparatus according to claim 1, wherein said first calculation unit calculates a gain amount corresponding to the first tone characteristics based on a representative luminance value of the person region detected by said detection unit, and calculates an input value range in which the first tone characteristics are configured to be used, based on a luminance distribution of the person region detected by said detection unit.

3. The apparatus according to claim 2, wherein said second calculation unit calculates the second tone characteristics so as to apply tone characteristics obtained by performing weighted addition of the predetermined tone characteristics and the first tone characteristics to the input value range in which the first tone characteristics are configured to be used.

4. The apparatus according to claim 2, wherein said second calculation unit calculates the second tone characteristics so as to apply the predetermined tone characteristics to an input value range in which the first tone characteristics are not configured to be used.

5. The apparatus according to claim 1, wherein the at least one hardware processor or circuit further implements the functions of a determination unit configured to determine an evaluation value of the person region detected by said detection unit,
wherein said second calculation unit calculates the second tone characteristics by performing weighted addition of the predetermined tone characteristics and the first tone characteristics based on the evaluation value determined by said determination unit.

6. The apparatus according to claim 5, wherein said determination unit determines the evaluation value based on a size of person region detected by said detection unit.

7. The apparatus according to claim 5, wherein said determination unit determines the evaluation value based on a position of the person region detected by said detection unit within the image.

8. The apparatus according to claim 1, wherein the at least one hardware processor or circuit further implements the functions of a backlit determination unit configured to determine whether the person region detected by said detection unit in a backlit state,
wherein a person region in which the first tone characteristics are calculated is a person region in a backlit state which is detected by said backlit determination unit.

9. The apparatus according to claim 2, wherein the at least one hardware processor or circuit further implements the functions of a hair region detection unit configured to detect a hair region of the person region detected by said detection unit,
wherein said first calculation unit calculates a gain amount corresponding to the first tone characteristics by referring to a luminance of a face skin region of the person region detected by said detection unit and a luminance of a hair region of the person detected by said hair region detection unit.

10. An image processing apparatus comprising:
at least one hardware processor or circuit implementing the functions of a detection unit, a first calculation unit, and an image processing unit, wherein:
the detection unit is configured to detect a person region included in an image;
the first calculation unit is configured to calculate first tone characteristics based on information concerning the person region detected by said detection unit; and
the image processing unit is configured to generate a tone-corrected image by performing weighted addition of an image generated by predetermined tone characteristics and an image generated by first tone characteristics calculated by said first calculation unit.

11. An image processing method comprising:
a detection step of detecting a person region included in an image;
a first calculation step of calculating first tone characteristics based on information concerning the person region detected in the detection step;
a second calculation step of calculating second tone characteristics based on predetermined tone characteristics and the first tone characteristics calculated in the first calculation step; and
an image processing step of performing tone correction processing by using the second tone characteristics calculated in the second calculation step.

12. A non-transitory computer readable storage medium storing a program for causing a computer to execute each step of an image processing method defined in claim 11.

13. An image processing method comprising:
a detection step of detecting a person region included in an image;
a first calculation step of calculating first tone characteristics based on information concerning the person region detected in the detection step; and
an image processing step of generating a tone-corrected image by performing weighted addition of an image generated by predetermined tone characteristics and an image generated by first tone characteristics calculated in the first calculation step.

14. A non-transitory computer readable storage medium storing a program for causing a computer to execute each step of an image processing method defined in claim 13.

* * * * *